United States Patent

Numata

(10) Patent No.: US 9,041,825 B2
(45) Date of Patent: May 26, 2015

(54) IMAGE PROCESSING APPARATUS

(75) Inventor: Kenji Numata, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 117 days.

(21) Appl. No.: 13/609,844

(22) Filed: Sep. 11, 2012

(65) Prior Publication Data

US 2013/0093908 A1    Apr. 18, 2013

Related U.S. Application Data

(60) Provisional application No. 61/546,232, filed on Oct. 12, 2011.

(51) Int. Cl.
*H04N 5/225* (2006.01)
*H04N 1/21* (2006.01)
*H04N 5/232* (2006.01)

(52) U.S. Cl.
CPC ....... *H04N 5/23232* (2013.01); *H04N 5/23209* (2013.01); *H04N 2005/2255* (2013.01)

(58) Field of Classification Search
CPC .................................................. H04N 5/23245
USPC ....................................................... 348/220.1
See application file for complete search history.

(56) References Cited

U.S. PATENT DOCUMENTS

| 2009/0237498 | A1* | 9/2009 | Modell et al. | 348/65 |
| 2009/0322895 | A1* | 12/2009 | Miyata | 348/222.1 |
| 2010/0066891 | A1* | 3/2010 | Kawashima | 348/333.11 |
| 2010/0182413 | A1* | 7/2010 | Numata | 348/65 |
| 2011/0157365 | A1* | 6/2011 | Sato | 348/158 |
| 2011/0312278 | A1* | 12/2011 | Matsushita et al. | 455/66.1 |
| 2014/0073885 | A1* | 3/2014 | Frangioni | 600/317 |

FOREIGN PATENT DOCUMENTS

| JP | 2001-111934 | * 4/2001 | ............. H04N 5/765 |
| JP | 2009-253418 | 10/2009 | |
| JP | 2009-253419 | 10/2009 | |

\* cited by examiner

*Primary Examiner* — Nhan T Tran
*Assistant Examiner* — Chan Nguyen
(74) *Attorney, Agent, or Firm* — Scully, Scott, Murphy & Presser, PC

(57) ABSTRACT

An image processing apparatus of the present invention includes: a video input section to which live video obtained by picking up an image of an object is inputted; a frame interpolation processing section which, by inserting an interpolated image between images of frames constituting the live video, performs processing for generating and outputting interpolated video of a frame rate set in advance; and a control section which, when an instruction for freezing video displayed on a display section is made, operates so as to cause a still image of a frame constituting the live video to be displayed on the display section.

4 Claims, 5 Drawing Sheets

FIG.2

| LENGTH OF INSERTION SECTION (m) | FRAME RATE OF LIVE VIDEO (fps) |
|---|---|
| 2.0 | 30 |
| 3.5 | 30 |
| 7.5 | 15 |
| 10.0 | 10 |

IMAGE PROCESSING APPARATUS

CROSS-REFERENCE TO RELATED APPLICATIONS

This application claims the benefit of U.S. Provisional Application No. 61/546,232 filed on Oct. 12, 2011, the entire contents of which are incorporated herein by reference.

BACKGROUND OF THE INVENTION

1. Field of the Invention

The present invention relates to an image processing apparatus.

2. Description of Related Art

Endoscope apparatuses in the industrial field are widely used at the time of inspection of an observed object such as piping in a factory. In the endoscope apparatuses in the industrial field, for example, when a deteriorated place, such as a scratch which has occurred in an observed object, is found, observation of the deteriorated place, recording of a still image including the deteriorated place, measurement of the size of the deteriorated place and the like are commonly performed.

As a technique capable of improving the frame rate of video obtained by an image pickup apparatus such as a camera, for example, frame interpolation processing as disclosed in Japanese Patent Application Laid-Open Publication No. 2001-111934 is widely known.

SUMMARY OF THE INVENTION

An image processing apparatus of an aspect of the present invention includes: a video input section to which live video obtained by picking up an image of an object is inputted; a frame interpolation processing section which, by inserting an interpolated image between images of frames constituting the live video, performs processing for generating and outputting interpolated video of a frame rate set in advance; and a control section which, when an instruction for freezing video displayed on a display section is made, operates so as to cause a still image of a frame constituting the live video to be displayed on the display section.

BRIEF DESCRIPTION OF THE DRAWINGS

FIG. 2 is a diagram showing an example of table data used in processing according to the present embodiment;

DETAILED DESCRIPTION OF PREFERRED EMBODIMENTS

An embodiment of the present invention will be described below with reference to drawings. FIGS. 1 to 5 relate to the embodiment of the present invention.

Figure 1:
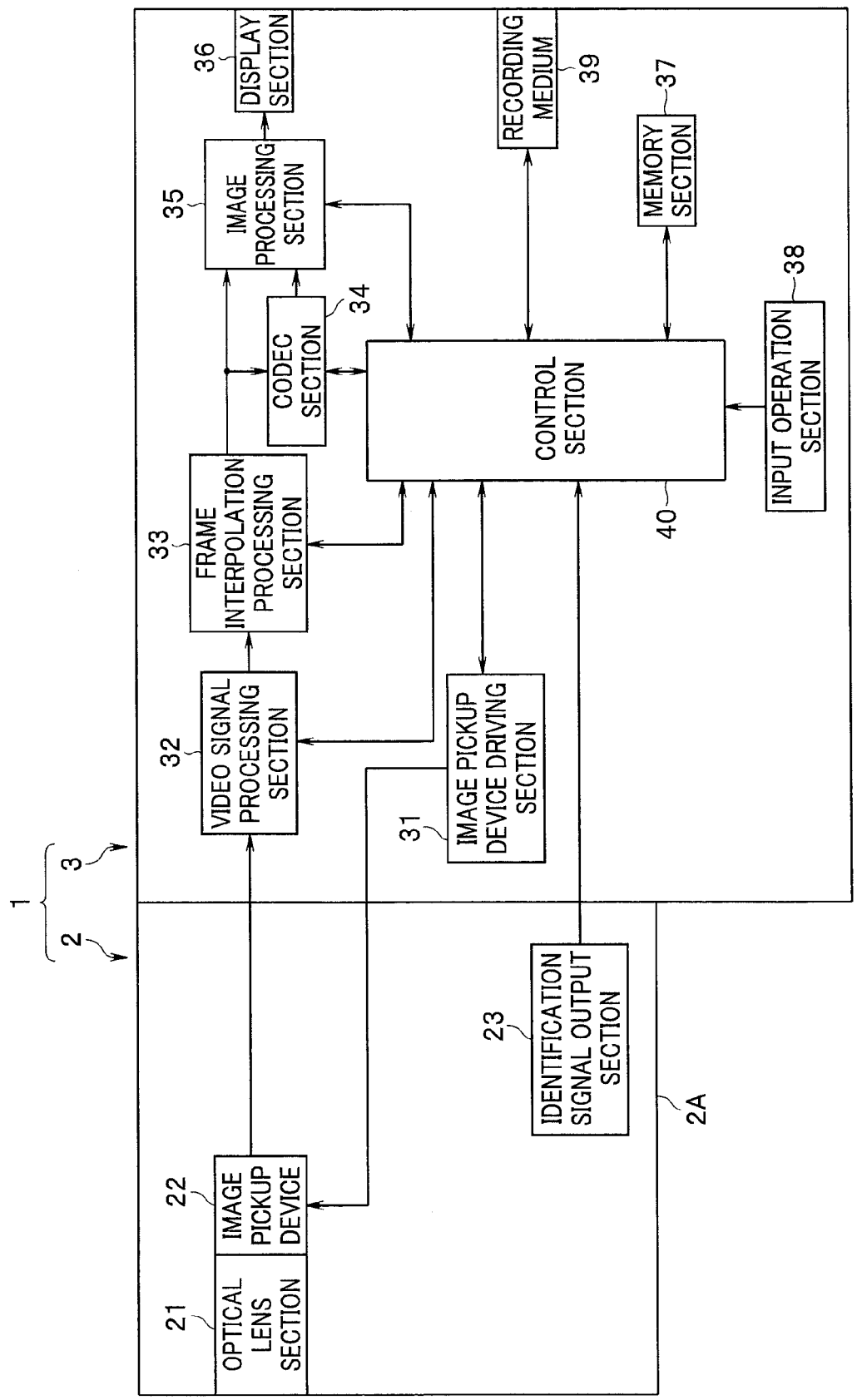
FIG. 1 is a block diagram showing the configuration of main parts of an endoscope apparatus for which an image processing apparatus according to an embodiment of the present invention is used.

FIG. 1 is a block diagram showing the configuration of main parts of an endoscope apparatus for which an image processing apparatus according to the embodiment of the present invention is used.

As shown in FIG. 1, an endoscope apparatus 1 is configured such that it has a scope section 2 configured as an endoscope provided with an insertion section 2A in a form insertable into the inside of an observed object such as a tube body, and a main body section 3 to which the scope section 2 can be attachably and detachably connected.

As shown in FIG. 1, the scope section 2 has an optical lens section 21, an image pickup device 22 and an identification signal output section 23.

The optical lens section 21 is configured being provided with one or more lenses. The optical lens section 21 is arranged at a position where reflected light of illumination light emitted from an illumination section (not shown), such as an LED, can be collected to the image pickup device 22 at a distal end portion of the insertion section 2A of the scope section 2.

The image pickup device 22 is provided at the distal end portion of the insertion section 2A of the scope section 2 and is configured so that it is driven in response to a driving signal provided from the main body section 3. The image pickup device 22 is also configured so that it picks up an image of an object within a visual field area of the optical lens section 21, generates an image pickup signal (live video) corresponding to the object and outputs it to the main body section 3.

The identification signal output section 23 is configured such that it can output an identification signal for enabling the main body section 3 to identify the length (total length) of the insertion section 2A when the scope section 2 is connected to the main body section 3.

Specifically, the identification signal output section 23 may be configured being provided with a memory in which, for example, information about the length (total length) of the insertion section 2A is stored in advance. According to such configuration, by the main body section 3 (a control section 40 to be described later) reading the information stored in the memory of the identification signal output section 23 when the scope section 2 is connected to the main body section 3, an identification signal which includes the information stored in the memory is outputted.

Otherwise, the identification signal output section 23 may be configured being provided with a section for generating an identification signal having a resistance value, a waveform or a voltage level determined in advance according to the length (total length) of the insertion section 2A. According to such configuration, when the scope section 2 is connected to the main body section 3, an identification signal enabling identification of the length (total length) of the insertion section 2A is outputted from the identification signal output section 23.

The main body section 3 is configured being provided with a function as the image processing apparatus according to the present embodiment. As shown in FIG. 1, the main body section 3 has an image pickup device driving section 31, a video signal processing section 32, a frame interpolation processing section 33, a codec section 34, an image processing section 35, a display section 36, a memory section 37, an input operation section 38, a recording medium 39 and a control section 40.

The image pickup device driving section 31 is configured such that it can perform driving control of the image pickup device 22 by generating a driving signal having a driving frequency in accordance with control by the control section 40 and providing the generated driving signal to the image pickup device 22.

The video signal processing section 32 provided with a function as a video input section is configured such that it can convert an analog image pickup signal (live video) outputted from the image pickup device 22 to a digital video signal (live video data), perform signal processing for adapting the frame rate of the digital video signal to a frame rate in accordance with control by the control section 40 and output the video signal (live video data) which has received the signal processing, to the frame interpolation processing section 33.

The frame interpolation processing section 33 is configured such that it can perform frame interpolation processing for converting the frame rate of a video signal (live video data) outputted from the video signal processing section 32 to a frame rate FRP (for example, 30 fps) set in advance and output the video signal which has received the frame interpolation processing (interpolated video data) to the codec section 34 and the image processing section 35, based on control by the control section 40.

Specifically, the frame interpolation processing section 33 performs such frame interpolation processing in which, for example, the number of interpolated frames is set, for example, by comparing the frame rate of live video data outputted from the video signal processing section 32 with the frame rate FRP set in advance, and interpolated video data is generated by inserting interpolated still image data for frames corresponding to the number of the interpolated frames each time image data corresponding to one frame is inputted from the video signal processing section 32.

The frame interpolation processing section 33 of the present embodiment is not limited to one which is configured to detect the frame rate of a video signal (live video data) outputted from the video signal processing section 32 based on control by the control section 40. The frame interpolation processing section 33 may be configured, for example, such that it includes a circuit or the like capable of detecting the frame rate of a video signal (live video data) outputted from the video signal processing section 32 by the frame interpolation processing section 33 itself.

The frame interpolation processing section 33 is also configured such that it can switch on/off (execution/suspension) of the frame interpolation processing based on control by the control section 40. Therefore, during the period in which the frame interpolation processing is off (suspended) under the control of the control section 40, the frame interpolation processing section 33 outputs a video signal (live video data) from the video signal processing section 32 immediately to the codec section 34 and the image processing section 35 without performing the frame interpolation processing.

The frame interpolation processing section 33 is also configured such that it can give an interpolation flag (enabling identification of being interpolated still image data) to each frame of interpolated still image data in the interpolated video data generated by the frame interpolation processing.

Furthermore, the frame interpolation processing section 33 is configured such that it can output freeze image data, which is a still image, by freezing a video signal (live video data) outputted from the video signal processing section 32 based on control by the control section 40.

The codec section 34 provided with a function as a video-for-recording generating section is configured such that it can generate image data (of a time-varying image or a still image) for recording by providing compression processing and the like based on a predetermined format for a video signal (live video data or interpolated video data) outputted from the frame interpolation processing section 33, and write (store) the generated image data for recording into the recording medium 39 via the control section 40.

The codec section 34 provided with a function as a video-for-reproduction generating section is configured such that it can generate image data for reproduction by providing expansion processing and the like based on a predetermined format for image data (of a time-varying image or a still image) read from the recording medium 39 by the control section 40, and output the generated image data for reproduction, to the image processing section 35.

Furthermore, the codec section 34 is configured such that it can output freeze image data, which is a still image, by freezing image data for reproduction based on control by the control section 40.

The image processing section 35 is configured such that it can display at least one of image data corresponding to a video signal (live video data or interpolated video data) outputted from the frame interpolation processing section 33 and image data (image data for reproduction) outputted from the codec section 34, based on control by the control section 40.

The image processing section 35 is also configured such that it can generate a GUI (graphical user interface), such as a menu bar, and superimpose the generated GUI on image data to be displayed on the display section 36.

Furthermore, the image processing section 35 is configured such that it can provide image processing, such as color space conversion, interlace-progressive conversion and gamma correction, in accordance with the specifications of the display section 36 for image data to be displayed on the display section 36.

The display section 36 is provided with an LCD (liquid crystal display) or the like and is configured such that it can display image data and the like outputted from the image processing section 35 on the display screen.

The memory section 37 is provided with storage devices such as RAM and ROM and is configured such that it can temporarily store a processing result of arithmetic processing by the control section 40 and the like.

Table data (to be described later) used in processing by the control section 40 is stored in the memory section 37 in advance.

The input operation section 38 is provided with a user interface such as a keyboard and is configured such that it can output an instruction signal corresponding to a user's input operation to the control section 40.

Specifically, the input operation section 38 is configured such that it can individually generate and output an instruction for freezing video displayed on the display section 36 (a freeze instruction), an instruction for releasing freeze of video on the display section 36 (a freeze release instruction), an instruction for executing desired measurement on image data displayed on the display section 36 (a measurement instruction), an instruction for recording image data displayed on the display section 36 to the recording medium 39 (as still image data) (a still image recording instruction), an instruction for reproducing and displaying image data (of an a time-varying image or a still image) recorded in the recording medium 39, on the display section 36, or the like in accordance with a user's input operation.

The recording medium 39 is attachable to and detachable from the main body section 3 and is configured by a portable memory card or the like in which image data for recording outputted from the control section 40 can be recorded (stored).

The control section 40 is provided with a CPU and the like and is configured such that it can perform control of each section of the endoscope apparatus 1 based on various input signals, such as an instruction signal outputted from the input operation section 38.

The control section 40 is also configured such that it can identify each of frames corresponding to interpolated still image data generated by the frame interpolation processing section 33 from among image data for recording generated by the codec section 34 based on the state of execution of frame interpolation processing by the frame interpolation processing section 33 (for example, the timing of interpolated still image data being inserted) and give an interpolation flag (enabling identification of being interpolated still image data) to the image data of each identified frame.

Furthermore, the control section 40 is configured such that it can perform measurement processing, for example, for obtaining a measured value of a distance between any two points in image data displayed on the display section 36 based on the instruction signal outputted from the input operation section 38.

Here, an operation and the like performed in the endoscope apparatus 1 will be described.

FIG. 2 is a diagram showing an example of table data used in processing according to the present embodiment.

When the main body section 3 is powered on, the control section 40 identifies the length (total length) of the insertion section 2A of the scope section 2 connected to the main body section 3 based on an identification signal outputted from the identification signal output section 23 and, furthermore, reads table data (see FIG. 2) in which a correspondence relationship between the length (total length) of the insertion section 2A and the frame rate of a video signal (live video) outputted from the image pickup device is set, from the memory section 37.

According to the present embodiment, it is not necessarily required that only one table data in which the correspondence relationship between the length (total length) of the insertion section 2A and the frame rate of a video signal (live video) outputted from the image pickup device is set be stored in the memory section 37. For example, multiple table data in which the correspondence relationship between the length (total length) of the insertion section 2A and the frame rate of a video signal (live video) outputted from the image pickup device is classified according to the resolution (the number of effective pixels) of the image pickup device may be stored in the memory section 37.

Furthermore, according to the present embodiment, for example, table data in which the correspondence relationship between the length (total length) of the insertion section 2A and the number of frames of a video signal (live video) outputted from the image pickup device is set may be stored in the memory section 37.

Furthermore, according to the present embodiment, for example, table data in which the correspondence relationship between the length (total length) of the insertion section 2A and a coefficient for the maximum frame rate of a video signal (live video) outputted from the image pickup device is set may be stored in the memory section 37.

The control section 40 selects a frame rate FR associated with a length corresponding to or almost corresponding to the length (total length) of the insertion section 2A of the scope section 2 connected to the main body section 3, from the table data read from the memory section 37, based on a result of identification of an identification signal outputted from the identification signal output section 23.

Then, the control section 40 performs control so as to cause a driving signal for executing output of an image pickup signal (live video) from the image pickup device 22 at the frame rate FR to be outputted from the image pickup device driving section 31.

The control section 40 also controls the video signal processing section 32 to output a video signal (live video data) at the frame rate FR.

Furthermore, the control section 40 outputs information about the frame rate FR selected from the table data read from the memory section 37, to the frame interpolation processing section 33.

Based on control by the control section 40, the frame interpolation processing section 33 detects that the video signal (live video data) from the video signal processing section 32 is outputted at the frame rate FR, executes frame interpolation processing in accordance with a result of comparison between the detected frame rate FR and a frame rate FRP set in advance, and outputs the video signal which has received the frame interpolation processing (interpolated video data) to the codec section 34 and the image processing section 35.

Specifically, for example, if the frame rate FR of the live video data=15 fps and the frame rate FRP=30 fps, then the frame interpolation processing section 33 sets the number of interpolated frames to 1, and generates interpolated video data of 30 fps by generating and inserting interpolated still image data corresponding to one frame each time image data corresponding to one frame is inputted from the video signal processing section 32.

For example, if the frame rate FR of the live video data=the frame rate FRP=30 fps, then the frame interpolation processing section 33 sets the number of interpolated frames to 0. Therefore, if the frame rate FR of the live video data=the frame rate FRP, then the frame interpolation processing by the frame interpolation processing section 33 is not performed, that is, the live video data of 30 fps is immediately outputted to the codec section 34 and the image processing section 35.

Then, the video signal (interpolated video data) outputted from the frame interpolation processing section 33 is outputted to the display section 36 via the image processing section 35, and it is also stored in the recording medium 39 as image data for recording in which an interpolation flag is given to each of frames of interpolated still image data in the interpolated video data.

Figure 3:
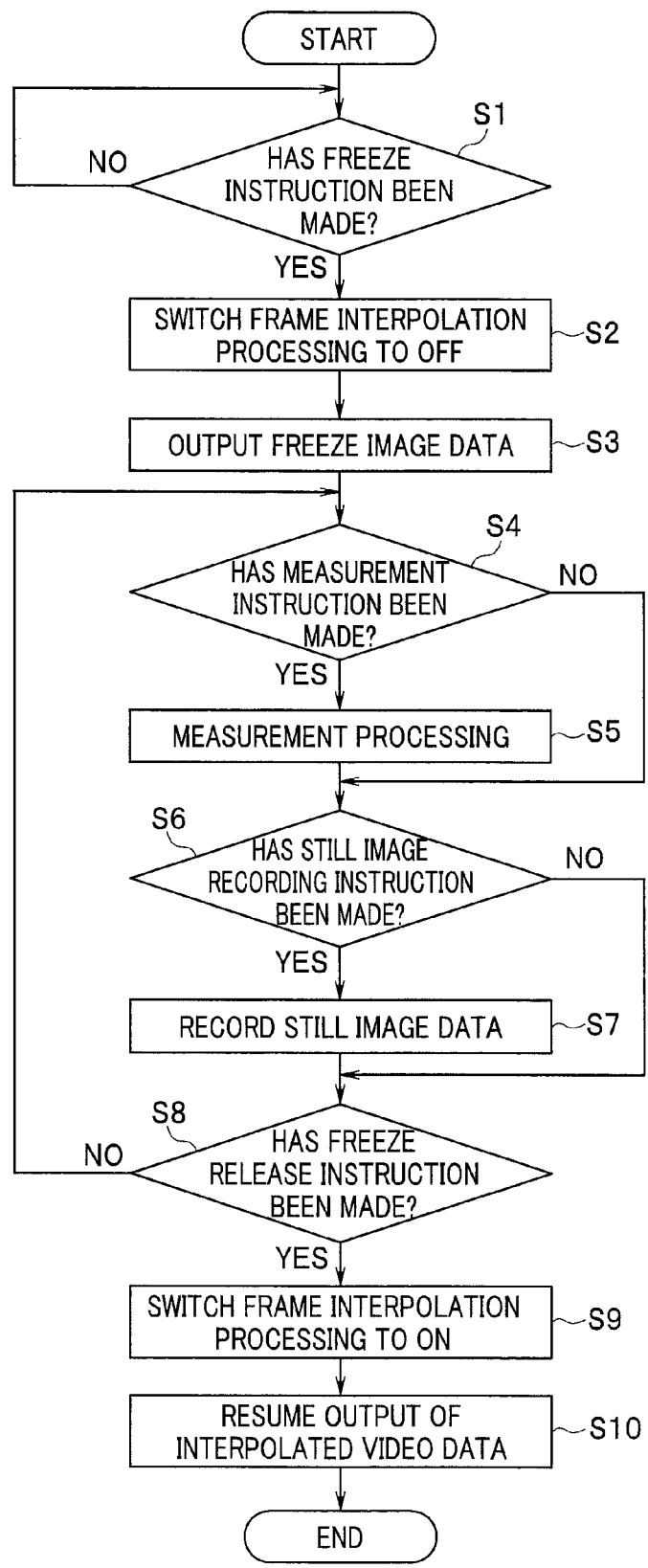
FIG. 3 is a flowchart showing an example of processing or the like performed in the image processing apparatus according to the present embodiment.

Here, description will be made on processing and the like performed in the case where interpolated video data without attachment of an interpolation flag is outputted from the frame interpolation processing section 33 and the interpolated video data is being displayed on the display section 36, with reference to the flowchart in FIG. 3 and the like. FIG. 3 is a flowchart showing an example of processing or the like performed in the image processing apparatus according to the present embodiment.

The control section 40 determines whether an instruction for freezing video displayed on the display section 36 (a freeze instruction) has been made or not, based on an instruction signal outputted from the input operation section 38 (step S1 in FIG. 3).

If a determination result that the freeze instruction has not been made is obtained at step S1 in FIG. 3, the control section 40 causes output of the interpolated video data to the display section 36 to be continued.

If a determination result that the freeze instruction has been made is obtained at step S1 in FIG. 3, the control section 40 controls the frame interpolation processing section 33 to output freeze image data, after switching the frame interpolation processing from on (execution) to off (suspension) (steps S2 and S3 in FIG. 3).

That is, after switching the frame interpolation processing to off (suspending the frame interpolation processing) based on the control of steps S2 and S3 in FIG. 3 by the control section 40, the frame interpolation processing section 33 outputs freeze image data obtained by freezing live video data outputted from the video signal processing section 32, to the codec section 34 and the image processing section 35. Then, according to such an operation of the frame interpolation processing section 33, freeze image data of a frame constituting the live image data outputted from the video signal processing section 32 is displayed on the display section 36.

After that, the control section 40 determines whether an instruction for executing desired measurement on the freeze image data displayed on the display section 36 (a measurement instruction) has been made or not, based on an instruction signal outputted from the input operation section 38 (step S4 in FIG. 3).

If a determination result that the measurement instruction has not been made is obtained at step S4 in FIG. 3, the control section 40 then performs the processing of step S6 in FIG. 3 to be described later.

If a determination result that the measurement instruction has been made is obtained at step S4 in FIG. 3, the control section 40 performs measurement processing in accordance with an instruction signal or the like outputted from the input operation section 38 (step S5 in FIG. 3).

Furthermore, the control section 40 determines whether an instruction for causing the freeze image data displayed on the display section 36 to be recorded to the recording medium 39 (as still image data) (a still image recording instruction) has been made or not, based on an instruction signal outputted from the input operation section 38 (step S6 in FIG. 3).

If a determination result that the still image recording instruction has not been made is obtained at step S6 in FIG. 3, the control section 40 then performs the processing of step S8 in FIG. 3 to be described later.

If a determination result that the still image recording instruction has been made is obtained at step S6 in FIG. 3, the control section 40 causes still image data for recording to be generated with the use of the freeze image data outputted at step S3 in FIG. 3, and, furthermore, controls the codec section 34 to record the still image data for recording to the recording medium 39 (step S7 in FIG. 3). Then, according to such control by the control section 40, freeze image data obtained by freezing the live image data outputted from the video signal processing section 32 is recorded to the recording medium 39 (as still image data for recording).

The control section 40 determines whether an instruction for releasing freeze of video on the display section 36 (a freeze release instruction) has been made or not, based on an instruction signal outputted from the input operation section 38 (step S8 in FIG. 3).

If a determination result that the freeze release instruction has not been made is obtained at step S8 in FIG. 3, the control section 40 returns to step S4 in FIG. 3 and performs the processing.

If a determination result that the freeze release instruction has been made is obtained at step S8 in FIG. 3, the control section 40 controls the frame interpolation processing section 33 to, after switching the frame interpolation processing from off (suspension) to on (execution), release freeze (stop output of the freeze image data) and resume output of the interpolated image data (steps S9 and S10 in FIG. 3).

Figure 4:
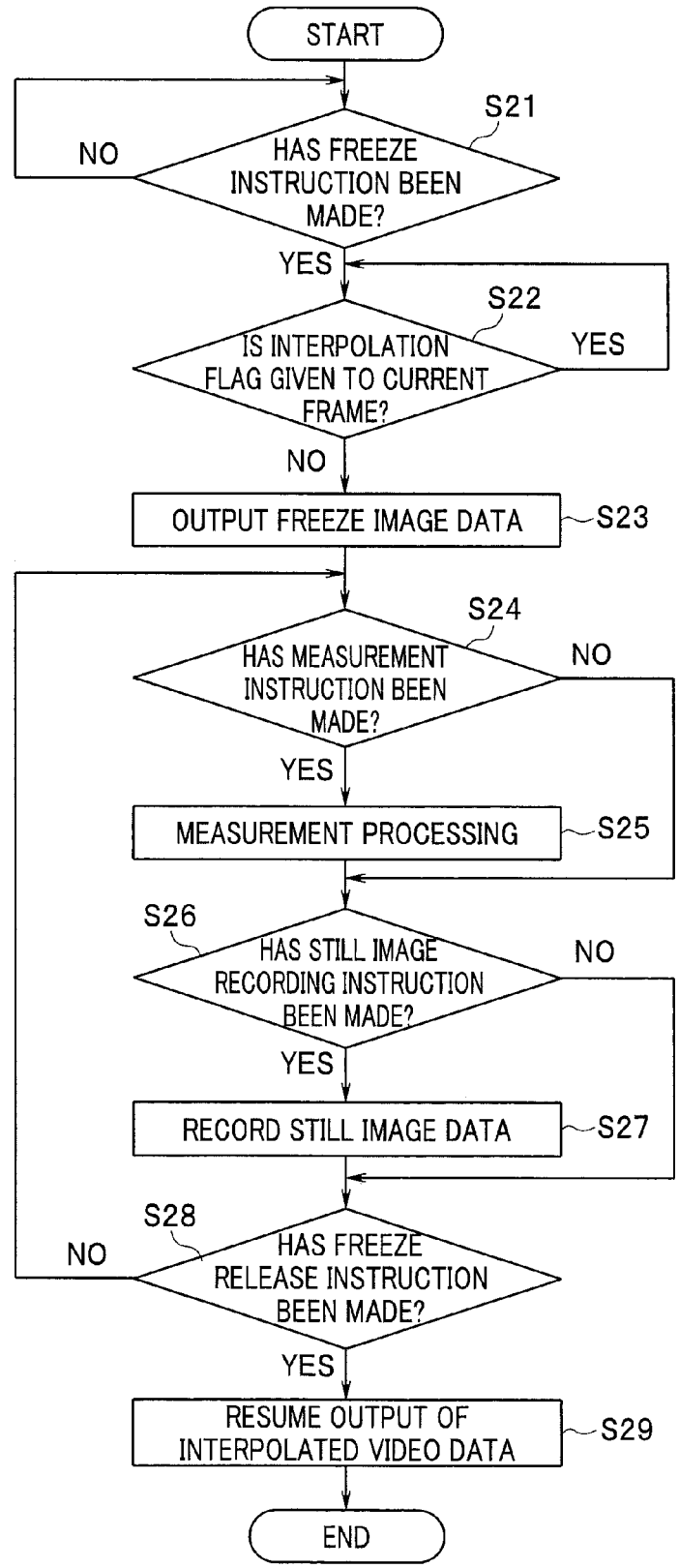
FIG. 4 is a flowchart showing an example of the processing or the like performed in the image processing apparatus according to the present embodiment, which is different from the example in FIG. 3.

Next, description will be made on processing and the like performed in the case where interpolated video data with attachment of an interpolation flag is outputted from the frame interpolation processing section 33 and the interpolated video data is being displayed on the display section 36, with reference to the flowchart in FIG. 4 and the like. FIG. 4 is a flowchart showing an example of the processing or the like performed in the image processing apparatus according to the present embodiment, which is different from the example in FIG. 3.

The control section 40 determines whether an instruction for freezing video displayed on the display section 36 (a freeze instruction) has been made or not, based on an instruction signal outputted from the input operation section 38 (step S21 in FIG. 4).

If a determination result that the freeze instruction has not been made is obtained at step S21 in FIG. 4, the control section 40 causes output of the interpolated video data to the display section 36 to be continued.

If a determination result that the freeze instruction has been made is obtained at step S21 in FIG. 4, the control section 40 further determines whether or not an interpolation flag is given to image data of the current frame displayed on the display section 36 (step S22 in FIG. 4).

If a determination result that the interpolation flag is given to the image data of the current frame displayed on the display section 36 is obtained at step S22 in FIG. 4, the control section 40 performs the determination processing of step S22 in FIG. 4 again for image data of a next frame.

If a determination result that the interpolation flag is not given to the image data of the current frame displayed on the display section 36 is obtained at step S22 in FIG. 4, the control section 40 controls the frame interpolation processing section 33 to output freeze image data at the timing of obtaining the determination result (step S23 in FIG. 4).

That is, the frame interpolation processing section 33 outputs freeze image data obtained by freezing a frame of live image data in the interpolated image data to the codec section 34 and the image processing section 35 based on the control of step S23 in FIG. 4 by the control section 40. Then, according to such an operation of the frame interpolation processing section 33, the freeze image data of the frame constituting the live image data included in the interpolated image data is displayed on the display section 36.

After that, the control section 40 determines whether an instruction for executing desired measurement on the freeze image data displayed on the display section 36 (a measurement instruction) has been made or not, based on an instruction signal outputted from the input operation section 38 (step S24 in FIG. 4).

If a determination result that the measurement instruction has not been made is obtained at step S24 in FIG. 4, the control section 40 then performs the processing of step S26 in FIG. 4 to be described later.

If a determination result that the measurement instruction has been made is obtained at step S24 in FIG. 4, the control section 40 performs measurement processing in accordance with an instruction signal or the like outputted from the input operation section 38 (step S25 in FIG. 4).

Furthermore, the control section 40 determines whether an instruction for causing the freeze image data displayed on the display section 36 to be recorded to the recording medium 39 (as still image data) (a still image recording instruction) has been made or not, based on an instruction signal outputted from the input operation section 38 (step S26 in FIG. 4).

If a determination result that the still image recording instruction has not been made is obtained at step S26 in FIG. 4, the control section 40 then performs the processing of step S28 in FIG. 4 to be described later.

If a determination result that the still image recording instruction has been made is obtained at step S26 in FIG. 4, the control section 40 causes still image data for recording to be generated with the use of the freeze image data outputted at step S23 in FIG. 4, and, furthermore, controls the codec section 34 to record the still image data for recording to the recording medium 39 (step S27 in FIG. 4). Then, according to such control by the control section 40, freeze image data obtained by freezing a frame of the live image data in the interpolated video data is recorded to the recording medium 39 (as still image data for recording).

The control section 40 determines whether an instruction for releasing freeze of video on the display section 36 (a freeze release instruction) has been made or not, based on an instruction signal outputted from the input operation section 38 (step S28 in FIG. 4).

If a determination result that the freeze release instruction has not been made is obtained at step S28 in FIG. 4, the control section 40 returns to S24 in FIG. 4 and performs the processing.

If a determination result that the freeze release instruction has been made is obtained at step S28 in FIG. 4, the control section 40 controls the frame interpolation processing section 33 to release freeze (stop output of the freeze image data) and resume output of the interpolated image data (steps S29 in FIG. 4).

Figure 5:
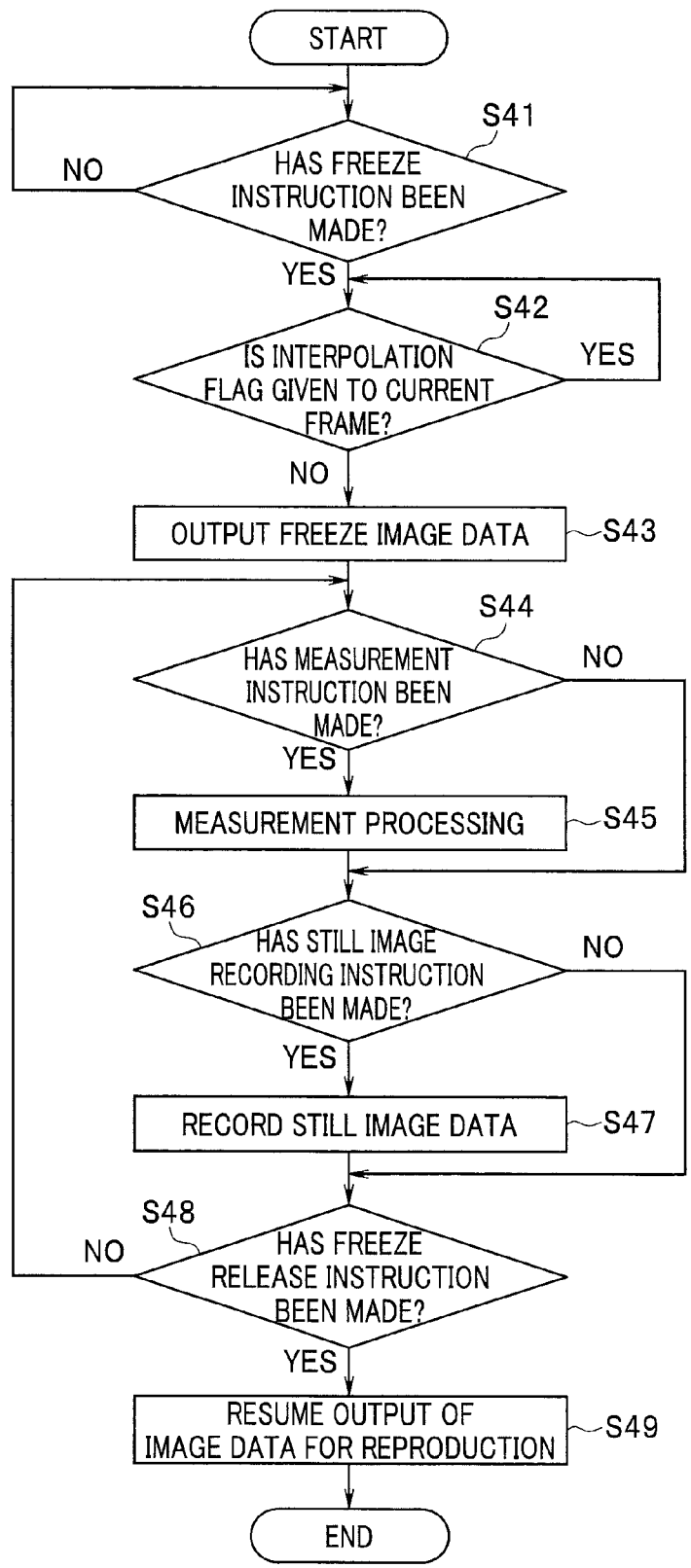
FIG. 5 is a flowchart showing an example of the processing or the like performed in the image processing apparatus according to the present embodiment, which is different from the examples in FIGS. 3 and 4.

Next, description will be made on processing and the like performed in the case where video data for recording with attachment of an interpolation flag is recorded in the recording medium 39 and video data for reproduction corresponding to the video data for recording is displayed on the display section 36, with reference to the flowchart in FIG. 5 and the like. FIG. 5 is a flowchart showing an example of the processing or the like performed in the image processing apparatus according to the present embodiment, which is different from the examples in FIGS. 3 and 4.

The control section 40 determines whether an instruction for freezing video displayed on the display section 36 (a freeze instruction) has been made or not, based on an instruction signal outputted from the input operation section 38 (step S41 in FIG. 5).

If a determination result that the freeze instruction has not been made is obtained at step S41 in FIG. 5, the control section 40 causes output of the video data for reproduction to the display section 36 to be continued.

If a determination result that the freeze instruction has been made is obtained at step S41 in FIG. 5, the control section 40 further determines whether or not an interpolation flag is given to image data of the current frame displayed on the display section 36 (step S42 in FIG. 5).

If a determination result that the interpolation flag is given to the image data of the current frame displayed on the display section 36 is obtained at step S42 in FIG. 5, the control section 40 performs the determination processing of step S42 in FIG. 5 again for image data of a next frame.

If a determination result that the interpolation flag is not given to the image data of the current frame displayed on the display section 36 is obtained at step S42 in FIG. 5, the control section 40 controls the codec section 34 to output freeze image data at the timing of obtaining the determination result (step S43 in FIG. 5).

That is, the codec section 34 outputs freeze image data obtained by freezing a frame corresponding to live video data in the video data for reproduction to the image processing section 35, based on control of step S43 in FIG. 5 by the control section 40. Then, according to such an operation of the codec section 34, the freeze image data obtained by freezing the frame corresponding to the live video data in the video data for reproduction is displayed on the display section 36.

After that, the control section 40 determines whether an instruction for executing desired measurement on the freeze image data displayed on the display section 36 (a measurement instruction) has been made or not, based on an instruction signal outputted from the input operation section 38 (step S44 in FIG. 5).

If a determination result that the measurement instruction has not been made is obtained at step S44 in FIG. 5, the control section 40 then performs the processing of step S46 in FIG. 5 to be described later.

If a determination result that the measurement instruction has been made is obtained at step S44 in FIG. 5, the control section 40 performs measurement processing in accordance with an instruction signal or the like outputted from the input operation section 38 (step S45 in FIG. 5).

Furthermore, the control section 40 determines whether an instruction for causing the freeze image data displayed on the display section 36 to be recorded to the recording medium 39 (as still image data) (a still image recording instruction) has been made or not, based on an instruction signal outputted from the input operation section 38 (step S46 in FIG. 5).

If a determination result that the still image recording instruction has not been made is obtained at step S46 in FIG. 5, the control section 40 then performs the processing of step S48 in FIG. 5 to be described later.

If a determination result that the still image recording instruction has been made is obtained at step S46 in FIG. 5, the control section 40 causes still image data for recording to be generated with the use of the freeze image data outputted at step S43 in FIG. 5, and, furthermore, controls the codec section 34 to record the still image data for recording to the recording medium 39 (step S47 in FIG. 5). Then, according to such control by the control section 40, the freeze image data obtained by freezing a frame corresponding to the live image data in the video data for reproduction is recorded into the recording medium 39 (as still image data for recording).

The control section 40 determines whether an instruction for releasing freeze of video on the display section 36 (a freeze release instruction) has been made or not, based on an instruction signal outputted from the input operation section 38 (step S48 in FIG. 5).

If a determination result that the freeze release instruction has not been made is obtained at step S48 in FIG. 5, the control section 40 returns to step S44 in FIG. 5 and performs the processing.

If a determination result that the freeze release instruction has been made is obtained at step S48 in FIG. 5, the control section 40 controls the codec section 34 to release freeze (stop output of the freeze image data) and resume output of the video data for reproduction (steps S49 in FIG. 5).

An endoscope apparatus has a tendency that, as the length (total length) of the insertion section of an endoscope is longer, the impedance of a signal line inserted inside the insertion portion increases. Therefore, there is a problem that it is necessary to set the driving frequency of the image pickup device provided at the distal end portion of the insertion section lower than a desired frequency to perform driving, and, as a result, the frame rate of video obtained by the image pickup device decreases.

As a measure for solving such a problem, for example, utilization of frame interpolation processing disclosed in Japanese Patent Application Laid-Open Publication No. 2001-111934 is conceivable.

However, according to the frame interpolation processing described before, there may be a case that, for example, a still image in which the form and(or) the size of a desired object is not correctly reproduced is used as an interpolated image.

Therefore, by utilizing the frame interpolation processing as described before, the frame rate of video which has decreased because of the problem described before can be improved, while a new problem occurs that, for example, an interpolated image cannot be used as an image for recording which indicates that an image of a desired object has been actually picked up, and that an interpolated image cannot be used as an image for measurement of a desired object.

According to the embodiment described above, while frame interpolation processing for the purpose of improving the frame rate of video (live video) which has decreased because of the problem described before is performed, control for causing a still image of a frame corresponding to live video data to be image data for recording and measurement is also performed.

Therefore, according to the embodiment described above, it is possible to, even in the case of utilizing the frame interpolation processing, ensure the quality of an image for recording and ensure the measurement accuracy at the time of performing measurement of a desired object.

The present invention is not limited to each embodiment described above, and, of course, various modifications and applications are possible within the range not departing from the spirit of the invention.

What is claimed is:

1. An image processing apparatus comprising:
a processor comprising hardware, the processor implementing:
   a video input section configured to process live video signal outputted by an image pickup device to generate frames of live video data having a first frame rate;
   a frame interpolation processing section configured to:
      process the live video data to generate frames of interpolated video data having a second frame rate by inserting one or more frames of interpolated image data in the live video data, and
      output the interpolated video data in advance; and
   a control section configured to:
      determine that an instruction has been made to select a frame of the interpolated video data during display of the interpolated video data,
      from the interpolated video data, select one frame of the live video data from among the one or more frames of the interpolated image data and the frames of the live video data forming the interpolated video data while avoiding selection of the one or more frames of the interpolated image data forming the interpolated video data, and
      output the selected one frame of the live video data forming the interpolated video data to a display.

2. The image processing apparatus according to claim 1, wherein the control section is further configured to:
   control the frame interpolation processing section to stop generating the interpolated video data after determining that the instruction has been made to display the frame of the interpolated video, and
   to output the selected one frame of the live video data forming the interpolated video data to the display after controlling the frame interpolation processing section to stop generating the interpolated video data.

3. The image processing apparatus according to claim 1,
wherein the frame interpolation processing section is further configured to give a flag to each of the one or more frames of interpolated image data inserted in the live video data;
wherein the control section is further configured to, after determining that the instruction has been made to select a frame of the interpolated video data, avoid selecting any frame of the interpolated image data forming the interpolated video data based on the flag given to each of the one or more frames of interpolated image data.

4. An image processing apparatus comprising:
a processor comprising hardware, the processor implementing:
   a video input section configured to process live video signal outputted by an image pickup device to generate frames of live video data having a first frame rate;
   a frame interpolation processing section configured to:
      process the live video data to generate frames of interpolated video data having a second frame rate by inserting one or more frames of interpolated image data in the live video data, and
      output the interpolated video data in advance;
   a video-for-recording generating section configured to process the interpolated video data to generate recording video data for storage in a memory;
   a video-for-reproduction generating section configured to process the recording video data stored in the memory to generate reproduction video data; and
   a control section configured to:
      give a flag to each of the one or more frames of interpolated image data inserted in the live video data based on the state of execution of the processing for generation of the interpolated video data by the frame interpolation processing section,
      determine that an instruction has been made to select a frame of the reproduction video data,
      after determining that the instruction has been made to select a frame of the reproduction video data, avoid selecting any frame of the interpolated image data forming the reproduction video data based on the flag given to each of the one or more frames of interpolated image data, and from the reproduction video data, select one frame of the live video data from among the one or more frames of the interpolated image data and the frames of the live video data forming the reproduction video data, and
      output the selected one frame of the live video data forming the reproduction video data to a display.

* * * * *